(12) United States Patent
Sun et al.

(10) Patent No.: US 12,673,481 B2
(45) Date of Patent: Jul. 7, 2026

(54) METHOD OF FORMING MICROPATTERNED SURFACE USING IRRADIATION ON A MOISTURE RESPONSIVE MULTI-LAYER FILM AND FILM USED IN SUCH METHOD

(71) Applicants:University of Connecticut, Farmington, CT (US); Dartmouth College, Hanover, NH (US)

(72) Inventors: Luyi Sun, Storrs, CT (US); Songshan Zeng, Willington, CT (US); Zi Chen, Norwich, VT (US); Yin Liu, Changsha (CN)

(73) Assignees: UNIVERSITY OF CONNECTICUT, Farmington, CT (US); DARTMOUTH COLLEGE, Hanover, NH (US)

( * ) Notice: Subject to any disclaimer, the term of this patent is extended or adjusted under 35 U.S.C. 154(b) by 149 days.

(21) Appl. No.: 18/024,815

(22) PCT Filed: Oct. 5, 2021

(86) PCT No.: PCT/US2021/053532
§ 371 (c)(1),
(2) Date: Mar. 6, 2023

(87) PCT Pub. No.: WO2022/076382
PCT Pub. Date: Apr. 14, 2022

(65) Prior Publication Data
US 2024/0025158 A1 Jan. 25, 2024

Related U.S. Application Data

(60) Provisional application No. 63/089,746, filed on Oct. 9, 2020.

(51) Int. Cl.
*G02F 1/1516* (2019.01)
*B32B 27/08* (2006.01)
(Continued)

(52) U.S. Cl.
CPC .............. *B32B 27/08* (2013.01); *B32B 27/16* (2013.01); *B32B 27/18* (2013.01); *B32B 27/283* (2013.01);
(Continued)

(58) Field of Classification Search
CPC .......... B32B 27/08; B32B 27/16; B32B 27/18
See application file for complete search history.

(56) References Cited

U.S. PATENT DOCUMENTS

2018/0050524 A1* 2/2018 Sun ...................... C07D 311/82
2018/0053445 A1 2/2018 Sun et al.
(Continued)

FOREIGN PATENT DOCUMENTS

WO WO-2018204817 A1 * 11/2018 .............. C08L 83/04

OTHER PUBLICATIONS

Jianwen Con, Juinjuan Wang, Jixun Xie, Chengfeng Yang, Jingxin Zhao, Lele Li, Yanping Cao, Andreas Fery, Xi-Qiao Feng, Conghua Lu. Determinative Surface-Wrinkling Microstructures on Polypyrrole Films by Laser Writing. Langmuir 2018. vol. 34, 4793-4802 (Year: 2018).*
(Continued)

Primary Examiner — Dah-Wei D. Yuan
Assistant Examiner — Kristen A Dagenais
(74) Attorney, Agent, or Firm — CANTOR COLBURN LLP

(57) ABSTRACT

A film comprises an elastomeric or soft polymer substrate that is capable of converting light to heat a second layer comprising a hydrophilic polymer and nanosheets of layered inorganic material dispersed in the hydrophilic polymer. The substrate can comprise a photothermal particle. The film can be used in a method by irradiating the film to cause wrinkles and optionally further exposing the film to moisture with optional drying.

16 Claims, 6 Drawing Sheets

(51) Int. Cl.

| | |
|---|---|
| *B32B 27/16* | (2006.01) |
| *B32B 27/18* | (2006.01) |
| *B32B 27/28* | (2006.01) |
| *B32B 27/30* | (2006.01) |
| *G02F 1/155* | (2006.01) |

(52) U.S. Cl.

CPC ...... *B32B 27/306* (2013.01); *B32B 2264/108* (2013.01); *B32B 2274/00* (2013.01); *B32B 2307/202* (2013.01)

(56) References Cited

U.S. PATENT DOCUMENTS

| | | |
|---|---|---|
| 2019/0022975 A1 | 1/2019 | Hurt et al. |
| 2020/0190271 A1 | 6/2020 | Al-Harthi et al. |
| 2020/0386687 A1 | 12/2020 | Noe et al. |
| 2021/0213718 A1 | 7/2021 | Sun et al. |

OTHER PUBLICATIONS

Songshan Zeng, Rui Li, Stephan G. Freire, Vivian M. M. Garbe/ Iotto, Emily Y. Huang, Andrew T. Smith, Cong Hu, William R. T. Tait , Zichao Bian, Guoan Zheng, Dianyun Zhang, and Luyi Sun. Moisture-Responsive Wrinkling Surfaces with Tunable Dynamics. Advanced Materials. 2017. col. 29. p. 1-7 (Year: 2017).*

Roth. Safety data Sheet Polyvinyl Alcohol. (Year: 2024).*

Layer-by-layer assembled PVA/Laponite multilayer free-standing films and their mechanical properties. T Umasankar Patro and H Daniel Wagner. IOP Publishing. Nanotechnology 22 (2011) 4557-6 (12pp) (Year: 2011).*

"Introduction to Nonwoven Filter Media", Retrieven from app. knovel.com, 2016; 52 pages.

Audoly et al., "Buckling of a stiff film bound to a compliant substrate—Part I: Formulation, linear stability of cylindrical patterns, secondary bifurcations", Journal of the Mechanics and Physics of Solids, vol. 56, 2008; pp. 2401-2421.

Chen et al., "Herringbone Buckling Patterns of Compressed Thin Films on Compliant Substrates", Journal of Applied Mechanics, vol. 71, 2004; 7 pages.

Cong et al., "Determinative Surface-Wrinkling Microstructures on Polypyrrole Films by Laser Writing", Langmuir, vol. 34, 2018; pp. 4793-4802.

Cummins, Herman Z., "Liquid, glass, gel: The phases of colloidal Laponite", Journal of Non-Crystalline Solids, vol. 353, 2007; pp. 3891-3905.

Davis et al., "Enhanced Adhesion of Elastic Materials to Small-Scale Wrinkles", Langmuir, vol. 28, 2012; pp. 14899-14908.

Ding et al., "Well-defined orthogonal surface wrinkles directed by the wrinkled boundary", The Royal Society of Chemistry, Soft Matter, vol. 9, 2013; pp. 3720-3726.

Ding, F. et al., "Biomimetic nanocoatings with exceptional mechanical, barrier, and flame-retardant properties from large-scale one-step coassembly", Science Advances, vol. 3, 2017; 9 pages.

Du, G. et al., "Nacre-mimetic composite with intrinsic self-healing and shape-programming capability", Nature Communications, vol. 10:800, 2019; 8 pages.

Ferreira et al., "Functionalization of polydimethylsiloxane membranes to be used in the production of voice prostheses", Sci. Technol. Adv. Mater., vol. 14, 2013; 9 pages.

Gurner et al., "Surface Wrinkling Induced by Photofluidization of Low Molecular Azo Glasses", ChemPhysChem, vol. 14, 2013; 8 pages.

Hou et al., "Light-reversible hierarchical patterns by dynamic photo-dimerization induced wrinkles", Journal of Materials Chemistry C, vol. 5, 2017; 9 pages.

Hou et al., "Smart Patterned Surface with Dynamic Wrinkles", Acc. Chem. Res., vol. 52, 2019; pp. 1025-1035.

International Search Report for the corresponding International Application No. PCT/US21/53532; International Filing Date: Oct. 5, 2021; Date of Mailing: Jan. 14, 2022; 3 pages.

Jiang et al., "Mass-Based Photothermal Comparison Among Gold Nanocrystals, PbS Nanocrystals, Organic Dyes, and Carbon Black", The Journal of Physical Chemistry, vol. 117, 2013; pp. 8909-8915.

Knoller , A. et al., Strengthening of Ceramic-based Artificial Nacre via Syneristic Interactions of 1D Vanadium Pentoxide and 2D Graphene Oxide Building Blocks, Scientific Reports, 9 pages.

Liang, B. et al., "Ca2+ Enhanced Nacre-Inspired Montmorillonite-Alginate Film with Superior Mechanical, Transparent, Fire Retardancy, and Shape Memory Properties", ACS Appl. Mater. Interfaces, vol. 8, 2016; pp. 28816-28823.

Liu et al., "Zinc ions enhanced nacre-like chitosan/graphene oxide composite film with superior mechanical and shape memory properties", Chemical Engineering Journal, vol. 321, 2017; pp. 502-509.

Mendez et al., "Bioinspired Mechanically Adaptive Polymer Nanocomposites with Water-Activated Shape-Memory Effect", Macromolecules, vol. 44, 2011; pp. 6827-6835.

Nishio et al., "Cellulose/Poly(vinyl alcohol) Blends Prepared from Solutions in N,N-Dimethylacetamide-Lithium Chloride", Macromolecules, vol. 21, 1988; pp. 1270-1277.

Qi et al., "Investigation of Salecan/poly(vinyl alcohol) hydrogels prepared by freeze/thaw method", Carbohydrate Polymers, vol. 118, 2015; pp. 60-69.

Qi et al., "Writing Wrinkles on Poly(dimethylsiloxane) (PDMS) by Surface Oxidation with a CO2 Laser Engraver", ACS Appl. Mater. Interfaces, vol. 10, 2018; pp. 4295-4304.

Rahmawan et al., "Recent advances in wrinkle-based dry adhesion", Soft Matter, vol. 10, 2014;12 pages.

Roy, I. et al., "Poor solvent and thermal annealing induced ordered crystallites in poly(3-dodecylthiophene) films", RSC Advances, vol. 5, 2015; pp. 665-675.

Umar et al., "Scalable Mesoporous Platinum Diselenide Nanosheet Synthesis in Water", ACS Omega, vol. 2, 2017; pp. 3325-3332; 8 pages.

Vandeparre et al., "Confined wrinkling: impact on pattern morphology and periodicity", The Royal Society of Chemistry, Soft Matter, vol. 7, 2011; pp. 6878-6882.

Wang et al., "All-Optical Reversible Azo-Based Wrinkling Patterns with High Aspect Ratio and Polarization-Independent Orientation for Light-Responsive Soft Photonics", ACS Appl. Mater. Interfaces, vol. 11, 2019; pp. 25595-25604.

Written Opinion for the corresponding International Application No. PCT/US21/53532; International Filing Date: Oct. 5, 2021; Date of Mailing: Jan. 14, 2022; 5 pages.

Wu, Q. et al., "Facile and Universal Superhydrophobic Modification to Fabricate Waterborne, Multifunctional Nacre-Mimetic Films with Excellent Stability", Applied Materials and Interfaces, vol. 6, 2014; pp. 20597-20602.

Xing et al., "Enhanced mechanical properties, water stability and repeatable shape recovery behavior of Ca2+ crosslinking graphene oxide-based nacre-mimicking hybrid film", Materials and Design, vol. 115, 2017; pp. 46-51.

Zeng et al., "Moisture-Responsive Wrinkling Surfaces with Tunable Dynamics", Adv. Mater., vol. 29, 2017; 7 pages.

Zhou et al., "Structure and mechanical properties of transparent layered nanocomposites from LAPONITE®—hydroxyethyl cellulose vacuum-assisted self-assembly", RSC Advances, vol. 5, 2015; 9 pages.

Zhou, L. et al., "Dynamic Interpenetrating Polymer Network (IPN) Strategy for Multiresponsive Hierarchical Pattern of Reversible Wrinkle", ACS Appl. Mater. Interfaces, vol. 11, 2019; pp. 15977-15985.

Zhu et al., "Light-Adaptive Supramolecular Nacre-Mimetic Nanocomposites", Nano Letters, vol. 16, 2016; pp. 5176-5182.

Zong et al., "Patterning Surfaces on Azo-Based Multilayer Films via Surface Wrinkling Combined with Visible Light Irradiation", Macromolecular Rapid Communications, vol. 37, 2016; pp. 1288-1294.

Zong et al., "Photocontrollable Wrinkle Morphology Evolution on Azo-Based Multilayers for Hierarchical Surface Micropatterns Fabrication", Langmuir, vol. 35, 2019; pp. 2601-2609.

(56) References Cited

OTHER PUBLICATIONS

Zong et al., "Tuning and Erasing Surface Wrinkles by Reversible Visible-Light-Induced Photoisomerization", Angew. Chem. Int. Ed., vol. 55, 2016; pp. 3931-3935.

* cited by examiner

LASER INSCRIBE | LE POWER = 1.05 W

IMPROVED ALIGNMENT

RE-MOISTURIZED | MOISTURIZED AND DRIED

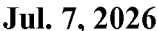
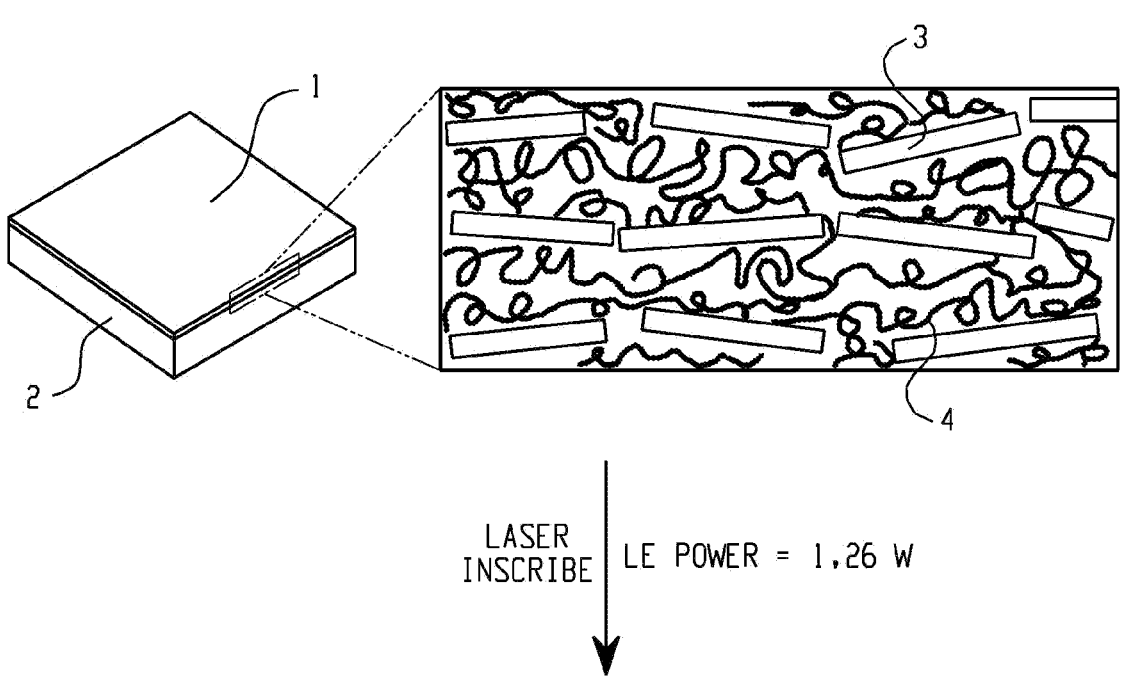
LASER
INSCRIBE | LE POWER = 1,26 W
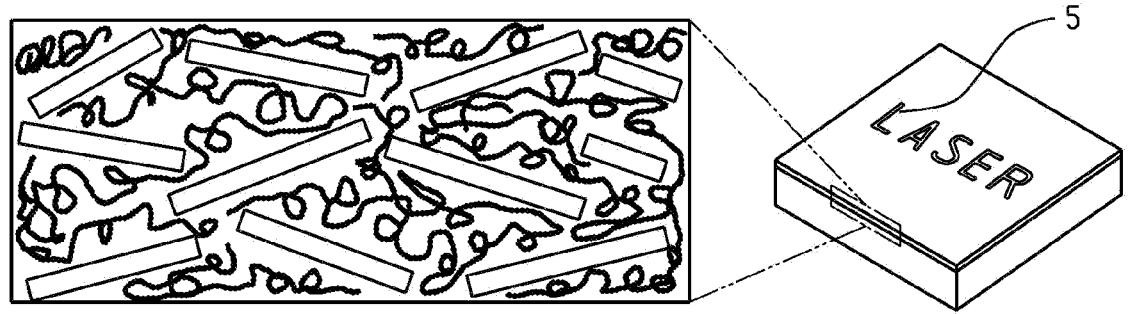
DECREASED ALIGNMENT
RE-MOISTURIZED | MOISTURIZED AND DRIED
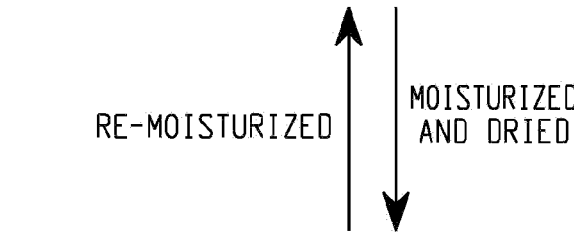
*Fig. 5*
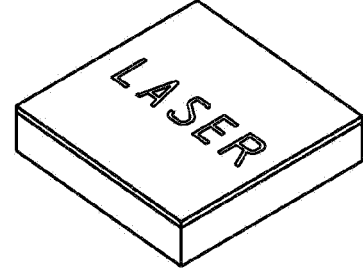

METHOD OF FORMING MICROPATTERNED SURFACE USING IRRADIATION ON A MOISTURE RESPONSIVE MULTI-LAYER FILM AND FILM USED IN SUCH METHOD

CROSS-REFERENCE TO RELATED APPLICATIONS

This application is a National Stage application of PCT/US2021/053532, filed Oct. 5, 2021, which claims benefit of U.S. Application No. 63/089,746 filed on Oct. 9, 2020, both of which are incorporated by reference herein in their entirety.

FIELD OF THE INVENTION

The field of this invention is a photoirradiation addressable multi-layer film and methods of use of such film in forming images and/or moisture responsive electrically conductive films.

BACKGROUND

Micro-structured surface in natural organisms have inspired micro/nano fabrication of analogous intelligent surfaces such as wrinkles, a mechanical instability created by compressing a rigid thin film attached to a soft substrate, which demonstrate dynamic responsiveness to external stimuli, such as light or moisture, for numerous applications, including information recording and encryption, smart adhesion, and soft photonics.

Light induced wrinkled surfaces are commonly fabricated based on photo tunable chemicals, such as azo-based polymers, reversible UV crosslinked networks, etc. Although decent progress has been achieved, limitations still exist. For example, these light responsive materials require relatively complicated synthesis processes.

SUMMARY OF THE INVENTION

Disclosed herein is a method comprising providing a film of a soft polymeric or elastomeric substrate capable of absorbing light and converting it to heat and a second layer directly or indirectly adhered to the substrate, the second layer comprising a hydrophilic polymer and nanosheets of a layered inorganic material, irradiating the film with a source of radiation, such as a laser, to form wrinkles in a region of the film that was irradiated. The method can further comprise exposing the second layer to moisture.

Also disclosed is a film comprising an elastomeric or soft polymer substrate that is capable of converting light to heat a second layer comprising a hydrophilic polymer and nanosheets of layered inorganic material dispersed in the hydrophilic polymer.

BRIEF DESCRIPTION OF THE DRAWINGS

FIG. 5 is an example of a method of imaging on the film of FIG. 4.

DETAILED DESCRIPTION OF THE INVENTION

Figure 1:
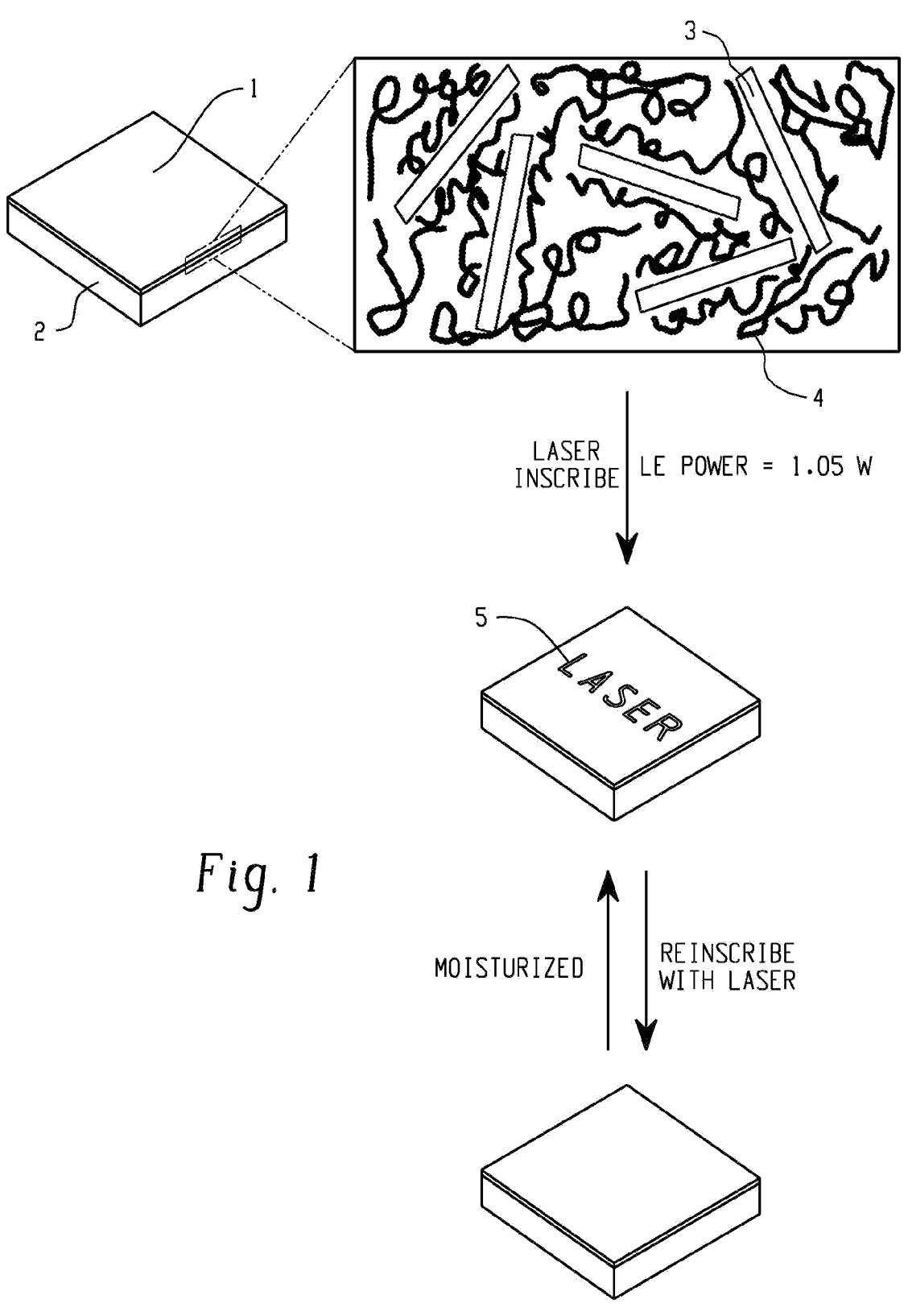
FIG. 1 is an example of a film and method of imaging on the film.

The film disclosed herein which is responsive to two or more different types of stimuli in changing microstructure (e.g., wrinkling, changing reflectance and/or transmittance of light, forming layer discontinuities, and the like) is advantageous in that it is more versatile and adaptable than films that are responsive in microstructure only to light or responsive in microstructure only to moisture. For instance, the tunability of laser induced wrinkles by other stimuli endows a dynamic, interactive, and convertible smart optical system, that can decode various types of stimuli by changes of optical or other wrinkle properties. These responses to multiple stimuli can be helpful in the fields of sensors, encryption, smart optics, interactive electronics, and other advanced materials systems. Also, it offers new routes to further reveal the unexploited wrinkle modulation mechanisms and undeveloped methodology for tuning wrinkle responsive dynamics. Additionally, decoupling the stimuli can give greater control in manipulating each stimulus independently without cross-interference. For example, applying moisture in addition to light to modulate the wrinkles (such as erase and/or re-activate) can avoid unwanted re-generation of wrinkles. Since moisture is readily available in daily life, such as from human breath, humid air, or wet mist from the natural environment or man-made devices, it can be considered as an ubiquitous and highly accessible stimulus to modulate the responsiveness of the light induced wrinkles.

The films disclosed herein comprise a first soft polymeric or elastomeric layer (also referred to as a substrate) that is capable of absorbing light and converting it to heat (photothermally active materials). For example, elastomeric materials can comprise a silicone elastomer such as polydimethylsiloxane (PDMS), polyurethane rubber, polyacrylate rubber, acrylic rubber, natural rubber, fluoroelastomer, ethylene-propylene rubber, ethylene-butene rubber, ethylene-propylene-diene monomer rubber, epichlorohydrin rubber, hydrogenated nitrile rubber, polyether block aides, ethylene vinyl acetate, styrene-diene based rubbers, such as styrene butadiene-styrene, styrene ethylene butene styrene, acrylonitrile butadiene styrene, acrylonitrile ethylene propylene diene styrene, styrene isoprene styrene, styrene ethylene propylene styrene, methyl methacrylate butadiene styrene, or combinations thereof can be used. To achieve the light absorption and light to heat conversion a light-to-heat converting material (also referred to as a photothermally active particle) can be mixed into the soft polymer or elastomer. Examples of such light-to-heat converting material includes carbon black, carbon nanotube, carbon nanofiber, carbon fiber, amorphous carbon, graphite, graphene, graphene oxide, boron nitride, antimony tin oxides, indium tin oxides, tungsten oxides, zinc oxide, poly(pyrrole), and poly(3,4-ethylenedioxythiophene), polyanilines. The weight ratio of the elastomer or soft polymer material to the photothermally active particle can be from 5:1 to 500:1, 10:1 to 400:1, 20:1 to 300:1, 50:1 to 200:1, or 100:1 to 150:1. The photothermally active particle can have an average particle size of 10 to 100, or 20-60, nanometers (nm). The particle size can be measured by methods known in the art such as for example by transmission electron microscopy, dynamic light scattering, or the like. The thickness of the first layer can be 0.1 to 5, or 0.5 to 2, millimeters (mm). The Young's modulus of the substrate layer can be in the range of 1 kilopascals (kPa) to 5 megapascals (MPa), 10 to 1000 kilopascals, 20 to 500 kilopascals, or 50 to 200 kilopascals (i.e., 0.05 to 0.2 MPa) according to ASTM 638-99 as measured for example using an Instron universal mechanical tester.

The films disclosed herein also comprise a second layer directly or indirectly adhered to the substrate. For example, the film of the second layer can be covalently bonded to the substrate. As another example, the second layer can be considered indirectly adhere to the substrate if a thin adhesion layer is used between the substrate and the second layer. The second layer comprises layered inorganic material dispersed in a hydrophilic polymer. The layered inorganic material can be in the form of nanosheets. The nanosheets can have a long dimension (e.g., radius or length and width) of 10 to 100, 15-75, or 20-50 nanometers (nm). The nanosheet of the layered inorganic material can have a thickness of from 0.1 or 0.2 or 0.3 nm up to 10, 5, 2, 1.5 or 1 nm. As an example, the nanosheet can have a disc shape of 25 to 35 nm and a thickness of 0.92 nm. The amount of the layered inorganic material in the second layer can be from 5 to 60, or 10 to 50, weight percent based on total weight of the second layer. Layered inorganic material being present in amounts of less than 30, or 1 to 25 or 2 to 20, or 3 to 15 weight percent based on total weight of the second layer, can lead to a random distribution which can lead to a re-writable film—e.g., exposure to moisture can erase the wrinkling and subsequent exposure to radiation can cause new wrinkling. Higher amounts of the layered inorganic material (e.g., at least 30 or at least 35 weight percent or 30 to 50 weight percent or 35-50 weight percent based on total weights of the second layer) can lead to an aligned structure (e.g., nacre-like ordered structure). Thus, the thickness-wise nanostructure of the second film is mainly determined by the ratio of layered inorganic material (e.g., laponite) to hydrophilic polymer (e.g., polyvinyl alcohol or copolymer thereof (PVA)). For example, due to the space confinement effect and evaporation induced orientation of laponite nanosheets in the second layer during the drying process, the laponite nanosheets can align along the plane direction of the formed film particularly at higher loadings. A higher ratio (e.g., laponite:PVA) ratio typically leads to a better nacre-like ordered structure. PVA chains contain both hydroxyl and acetate side groups. The average molar ratio of the hydroxyl groups to the sum of all side groups on PVA chains is denoted as the degree of hydrolysis (DH). Note that both the crystallinity and the moisture resistance of PVA have a positive correlation with the DH. Hence, the DH of PVA can strongly influence the moisture responsiveness of the resultant PVA/LP film. Examples of layered inorganic material be a synthetic phyllosilicate clay. For example, the layered inorganic material can be laponite or $Na^{+}_{0.7}[(Si_8Mg_{5.5}Li_{0.3})O_2\_(OH)_4]^{-0.7}$. The layered inorganic material can improve mechanical strength and dimensional stability without sacrificing transparency.

As one example, the hydrophilic polymer can comprise the following repeat units: $-(CH_2-CHOH)_m-$, and $-(CH_2-CHOCOCH_3)_n-$ where m and n designate the repeat number of $-CH_2-CHOH-$ and $-CH_2-CHOCOCH_3-$ groups, respectively, in the polymer chains. The $m/(m+n)\times100$ indicates the percent degree of hydrolysis in the polymer. PVA as used herein refers to such hydrophilic polymers as described above. A degree of hydrolysis (DH) of PVA in the range of 75 to 90% can enable a re-writable film—i.e., wrinkling caused by irradiation can be erased by exposure to moisture and subsequent re-exposure to irradiation can create new wrinkling. The hydrophilic polymer can have a weight average molecular weight in the range of 10,000 to 500,000. Molecular weight can be measured by known techniques such as gel permeation chromatography size exclusion chromatography (GPC/SEC).

To form the film a combination of the hydrophilic polymer (e.g., PVA) and the layered inorganic material (e.g., laponite nanosheets) can be coated or cast for example from aqueous solution onto a carrier. The carrier can be a polymer, such as, for example, polystyrene, polyester, polyethylene, polypropylene, poly(methyl methacrylate), polylactic acid, polycarbonate, polyimide, polytetrafluoroethylene, polyvinylidene fluoride, polyformaldehyde, or polyurethanes. Optionally, to improve adhesion to the elastomeric or soft polymer substrate, the cast film can then be surface treated—for example with allyl isocyanate (which enables covalent bonding with a subsequent elastomer/soft polymer (e.g., PDMS) layer), corona treatment or application of an adhesion layer such as a vinyl silane (e.g., trimethoxy vinyl silane) or viny epoxy resin. If an adhesion layer is used, its thickness should be no more than 500 nm. The elastomeric or soft polymer layer (e.g., a mixture of PDMS and carbon black) can then be coated onto the hydrophilic polymer/inorganic material layer. The film comprising the elastomeric or soft polymer substrate can then be removed from the carrier. This procedure can generate distributed aligned cracks on the brittle PVA/LP films containing a high concentration of layered inorganic material (e.g., laponite concentrations around 40 weight percent in PVA) while the films containing a low concentration of layered inorganic material (e.g., 10 wt. % laponite in PVA) are sufficiently ductile to remain intact without cracks.

Due to the presence of the hydrophilic polymer the film absorbs water upon exposure to moisture. This absorption causes the second layer to swell. Since the hydrophilic layer is somewhat constrained by the elastomer layer the film than can wrinkle which can be visibly observed.

The thickness of the second layer can be 10 nm to 5 mm, 50 nm to 1 mm, or 100 nm to 600 nm. The Young's modulus as measured by ASTM D 638-99 of the second film layer can be in the range of 500 MPa to 20 GPa, 600 MPa to 5000 MPa, or 750 to 1500 MPa as measured for example using by an Instron universal mechanical tester.

Overall, the radiation and moisture responsive film as disclosed in here can be impacted by the following variables: (1) photothermal active substrate; (2) film and substrate properties required for wrinkle formation; (3) moisture resistance of PVA; (4) ratio of LP to PVA and the corresponding nanostructure in the film; (5) laser power and scanning rate. These variables collectively determine the moisture responsiveness of the irradiation induced wrinkles.

The film disclosed herein can be used in a method where image can be formed on the film. The method can comprise providing the film and irradiating the film with a source of radiation, such as a laser, to form wrinkles in a region that of the film that was irradiated.

Figure 2:
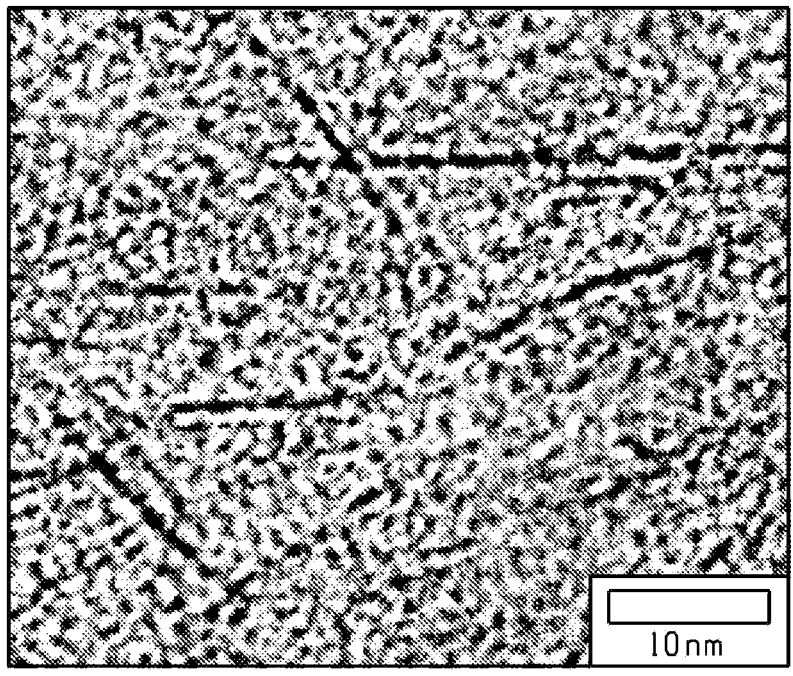
FIG. 2 is an electron microscopy picture of the film as in FIG. 1

The method can further comprise exposing the irradiated film to moisture. Where the distribution of the layered inorganic material is random—e.g., where the loading of the layered inorganic material in the second layer is relatively low (e.g., up to 30 weight percent) and/or where the hydrophilic polymer (e.g., PVA) has a relatively low degree of hydrolysis (e.g., 75 to 90%), such exposure can remove the wrinkles. The method can also comprise drying the film at the exposure to moisture. The method can also comprise re-exposing the film to radiation to form new wrinkles. This method is achievable with relatively low loadings of the layered inorganic material in the second film layer. For example, FIG. 1 shows the process with a film comprising a second layer 1 on an elastomeric first layer 2. The second layer comprises 90 weight percent based on weight of the layer of a hydrophilic polymer (e.g., PVA) with a degree of hydrolysis of about 88%, a lower weight average molecular weight in the range of 10000 to 90,000 and 10 weight percent laponite. These characteristics of the second leads to a random distribution of the laponite 3 in the hydrophilic polymer 4. See also FIG. 2 showing an electron microscopy photo of the second layer. Upon laser inscribing at relatively low power (e.g., 1.05 watts (W)) the word laser on the film, the word laser is visible as wrinkled areas 5. Upon moisturization the wrinkles are released but can be re-inscribed with the laser again. As an alternative, stretching after the moisturizing and drying can reveal the originally radiation inscribed image.

Figure 4:
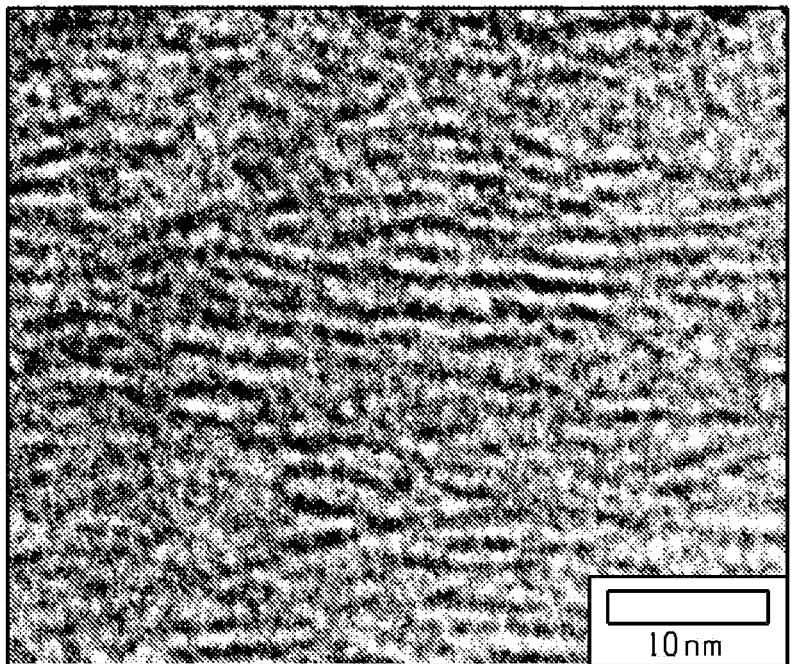
FIG. 4 is an electron microscopy picture of the film as in FIG. 3.
Figure 3:
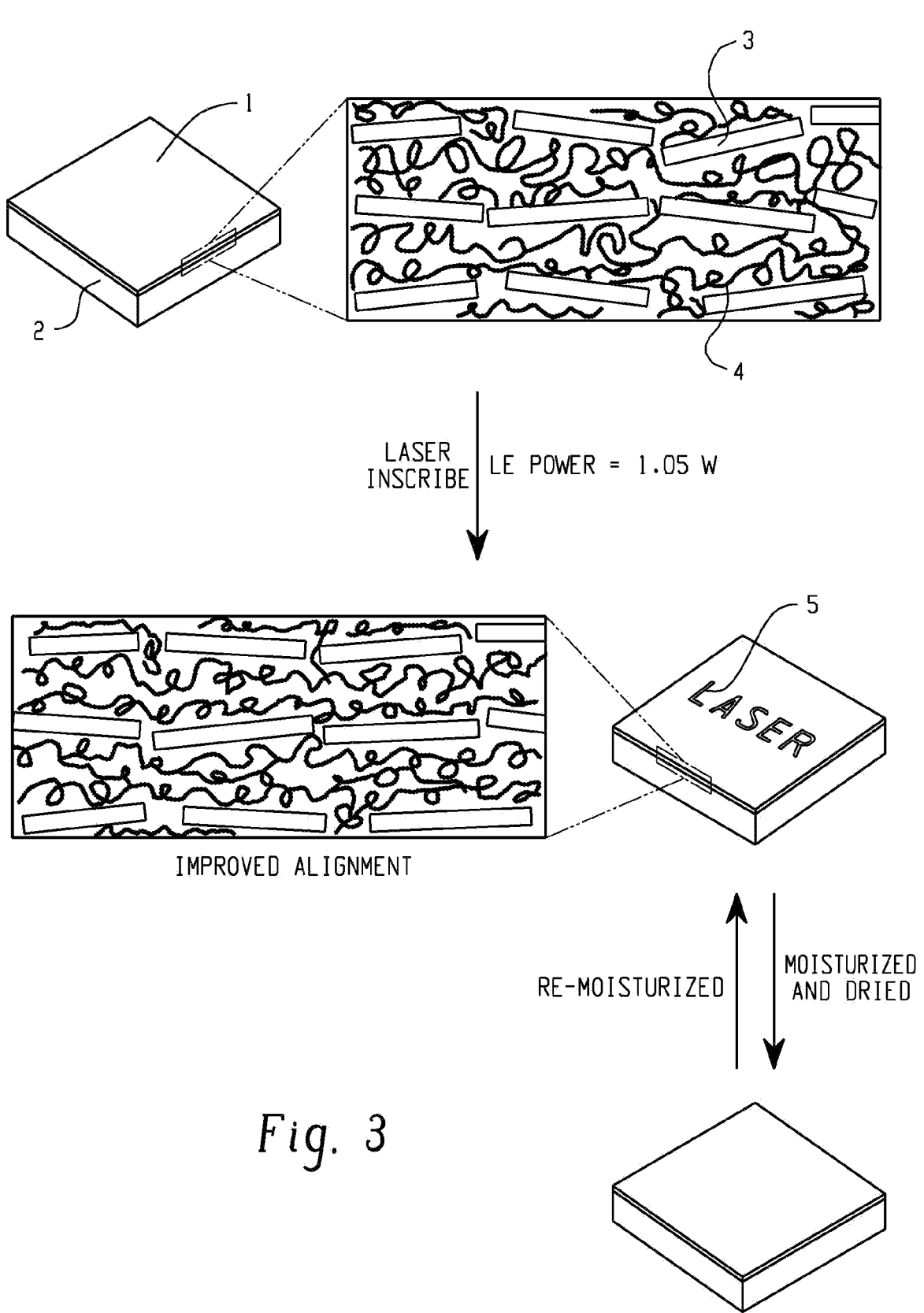
FIG. 3 is an example of a film and method of imaging on the film.

In an alternative, the exposure to moisture does not remove the wrinkles but the subsequent drying does remove the wrinkles. This can occur when there is a relatively high loading of layered inorganic material causing alignment of the layered inorganic material in the second layer (e.g., greater than 30 weight percent) and/or the hydrophilic polymer has a high degree of hydrolysis (e.g., at least 95%, or 95-99.99% or 95-99%) and/or a high weight average molecular weight (e.g., range of 90,000 to 500,000). Further where the power applied by the in radiation is relatively low, drying can remove the wrinkles while remoisturizing can cause the wrinkles to reappear. See, for example, in FIG. 3, a hydrophilic second layer 1 is on an elastomeric layer 2. The second layer 1 has a high loading of laponite 3 of about 40 weight percent in the hydrophilic polymer 4 (e.g., PVA) which a high degree of hydrolysis of about 99% and a high weight average molecular weight (e.g., 90,000 to 500,000) above shows a nacre-like alignment of the laponite 3 dispersed in the hydrophilic polymer 4. See also FIG. 4 which is an electron microscopy photograph of the second layer 1 as in FIG. 3. Upon laser inscribing at low power (e.g., 1.05 Watts) with a blue laser, a wrinkled image 5 corresponding to the laser escribing appears. Upon moisturization the image does not disappear but is does disappear upon drying. This is repeatable based on re-moisturization and re-drying. In contrast, for the same type of film, where a higher power radiation is applied the wrinkling can be irreversible. The irreversibility may be due to high degree of hydrolysis combined with deteriorated nanoalignment. For example, laser addressing at power of less than about 1.26 watts with a blue laser was found to be effective with this method. See FIG. 5 where the film having a second layer 1 comprising high loadings of the laponite 3 in the hydrophilic polymer 4 on the elastomeric layer 2 forms an image when exposed to higher power levels of radiation and where the image is not erasable, but rather is moisture resistant. Different irradiation powers can be used in different regions of the film. Thus, irradiating a first portion at a low power to form a first region that is characterized in that upon exposure to moisture and drying the wrinkles are removed but upon re-moisturizing the wrinkles are restored can be used together with irradiating a second portion at a high power to form a second region of wrinkles that are resistant to moisture and drying.

In yet another alternative, the second layer can comprise electrically conductive material and/or there is an electrically conductive layer on the second layer but there are cracks or gaps in the second layer. These cracks can form when the film is removed from the carrier substrate—particularly when the second layer is more brittle as, for example, when there is a high loading of the inorganic layered material. Where the second film has a lower loading of layered inorganic material and/or the hydrophilic polymer has a lower degree of hydrolysis as described above, exposure to radiation followed by exposure to moisture can cause the film to regain conductivity. See FIG. 6. The film comprises an elastomeric substrate 2, with a hydrophilic layer 1 thereon and a conductive layer 6, such as Poly(2,3-dihydrothieno-1,4-dioxin)-poly(styrene sulfonate)/Polyvinyl alcohol (PEDOT:PSS/PVA) on the hydrophilic layer 1. Cracks 7 in the layers 1 and 6 cause the film not to be conductive. Upon moisturizing wrinkles form and the cracks are closed. This effect can be seen in the photographic images included in FIG. 7.

The irradiation can be image-wise exposure such that portions of the film are irradiated and other portions are not. For example, exposure to radiation where part of the film is masked to protect from irradiation can be used. As another example, laser engraver can inscribe programmable maskless patterns by controlling the power and scanning rate used, acting as the stimulus to generate wrinkles regionally and tune the nanostructure in the film. For example, the resultant wrinkles can be tailored into (1) moisture erasable and re-writable; (2) moisture driven reversible; (3) moisture resistant. These modulations were achieved by controlling the moisture resistance of the hydrophilic polymer (e.g., PVA), and the dimensional stability of the second layer regulated by the morphology of the layered inorganic nanosheets (e.g., laponite) in the hydrophilic polymer matrix, which can be tuned by the concentration of the layered inorganic material and the laser power. These variables collectively and interactively dictate the moisture responsiveness of the wrinkles. This dynamic system can be applied for photo/moisture/mechanical responsive information recording/encryption device and moisture responsive electrical switch. Thus, film and method disclosed herein extends the scope of applications for next generation wrinkled devices.

An example of laser inscribing is using a laser source (e.g., wavelength=450 nm, maximum power=3.00 W) fixed on motorized sliders, allowing the laser beam to move in the x and y directions. The laser power, inscribing location, and exposure duration can be precisely controlled by software to generate a programmable laser inscribed wrinkled pattern. The software can set up a designated rectangular area that covers the preset pattern on the film. The laser power should be carefully regulated so that it can create sufficient photo-thermal effect to generate wrinkles without burning or melting the second layer (e.g., PVA/laponite composite thin film), which makes it completely different from other surface destructive engraving processes. During one inscribing cycle, the laser beam only scans in the x direction on the preset patterned area with the predetermined laser power, and switches to the non-engraving mode on the non-patterned area, and then moves in the y direction at the edge of the rectangular area prior to the next inscribing cycle. Since the laser beam only scans along the x direction on the patterned area, it can induce anisotropic compressive stress on the film to generate aligned wrinkles.

In summary, disclosed herein is a dynamic, versatile, convertible, and responsive laser writable wrinkled system, which was realized by a multi-scale photo/moisture reconstructible hybrid structure composed of a hydrophilic polymer/layered inorganic composite film (e.g., PVA/LP film) on a photothermally-active elastomeric or soft polymer substrate (e.g., comprising PDMS and carbon black). The spatiotemporally controllable laser can be used to generate programmable aligned wrinkles and also applied to tailor the morphology of the layered in organic material in the composite film. Finite Element Analysis (FEA) shows that the formation of aligned wrinkles originated from the anisotropic stress generated by the mismatched film-substrate expansion and the concomitant surrounding constraints. To modulate the moisture responsiveness of the laser generated wrinkles, the degree of hydrolysis of the hydrophilic polymer (e.g., PVA), the ratio of layered inorganic material (e.g., laponite) to hydrophilic polymer (e.g., PVA), and laser power can carefully to provide desired optical and moisture responses.

EXAMPLES

Summary of Examples

In a Sample A, the film contains low DH PVA (ca. 88%) and a low laponite concentration (10 wt. %). Thus, laser inscribed wrinkles can be readily erased by moisture and re-engraved by another laser inscribing cycle, which can be applied for moisture/photo/mechanical responsive information encryption/recording devices. A modified Sample A with high initial transparency can also be fabricated. In Sample B, the thin film is comprised of a high degree of hydrolysis PVA (ca. 99%) and a high laponite concentration (40 wt. %), which results in a topography with distributed cracks and nacre-like laponite alignment in the film. Under a 1.05 W LE power, the laser enribbed wrinkles formed while maintaining the alignment of laponite. This endowed the thin film with high dimensional stability and good shape recovery effect, which competed with the swelling stress during moisturization and residual stress originating from the laser inscribing process, to collectively determine the wrinkles' presence and/or disappearance. Herein, the wrinkles can be reversibly activated by further moisturization on the original laser inscribed area, concomitant with closing of open cracks. For the wrinkles generated by a 1.26 W laser power, the alignment of the laponite was undermined and dimension stability impaired, inducing the film with moisture resistant wrinkles. Herein, these novel properties enable a moisture responsive encryption device and a moisture responsive electrical switch based. Note that this switch can also be used as a relative humidity sensor coupling with optical and electrical signals. Since the wrinkled surface effectively scatters a much wider angle of light compared to the flattened counterpart due to its periodical microscale structure[11], this system can be further applied as a light diffusor, anti-glare surface, and broaden viewing angles for structural color devices.

Sample Preparation

Preparation of Sample A

A polyvinyl alcohol (PVA) and laponite (LP) composite film (mass ratio of PVA to laponite=9:1) with a thickness of ca. 350 nm was cast on a pre-cleaned polystyrene petri-dish foundation followed by the treatment of allyl isocyanate (from Alfa Aesar). The chosen PVA grade was POVAL™ 8-88 ($M_w$~ 67,000, degree of hydrolysis (DH)≈88%) obtained from KURARAY. Inc. The LP was acquired from BYK Additives Inc. A sample of 5.0 mg/mL PVA/LP aqueous dispersion was used for casting. Subsequently, a mixture of liquid polydimethylsiloxane (PDMS, Sylgard 184, base to curing agent ratio=30:1) precursor and carbon black (CB, particle size 30-50 nm, from Alfa Aesar, mass ratio of PDMS to CB=133:1) was cast atop the allyl isocyanate treated PVA/laponite film followed by cooling down to −10° C. in a freezer overnight to allow PDMS to thoroughly penetrate into the film to create a strong interface. The sample was then cured at 80° C. for 4 hours to form a soft solid sheet with a thickness of ca. 1 mm. This bilayer sheet was then carefully peeled away from the foundation in one direction. Subsequently, a laser engraver (NiocTech 3000 mW Mini desktop laser engraver machine) was used with a designated power at a scanning rate of 1.0 mm²/s to generate wrinkled patterns. Note that the top surface of the sample is exposed to the laser source at a distance of 8 cm.

Preparation of a Modified Sample A with High Transparency

The casting of PVA/LP composite film atop the polystyrene petri-dish and the allyl isocyanate treatment is the same as aforementioned. Subsequently, a thin layer of CB (concentration of CB=0.023 mg/cm²) is applied atop the PVA/LP surface via spray-coating by an airbrush style spray-gun (Master Airbrush G444-SET, needle nozzle 0.5 mm and Royal Mini Air Compressors, TC-20B). A layer of liquid PDMS precursor (base to curing agent ratio=30:1) was then cast atop the carbon black surface followed by cooling down to −10° C. in a freezer overnight. The sample was then cured at 80° C. for 4 hours to form a soft solid sheet with thickness of ca. 1 mm. The cured sample sheet was then carefully peeled away from the foundation in one direction.

Preparation of Sample B

The preparation of Sample B was the same as Sample A except for using KURARAY POVAL™ 28-99 ($M_w$~145, 000, DH≈88%) as the PVA matrix and a different mass ratio of PVA to LP=6:4.

Preparation of a Modified Sample B for Moisture Responsive Electrical Switch

Figure 6:
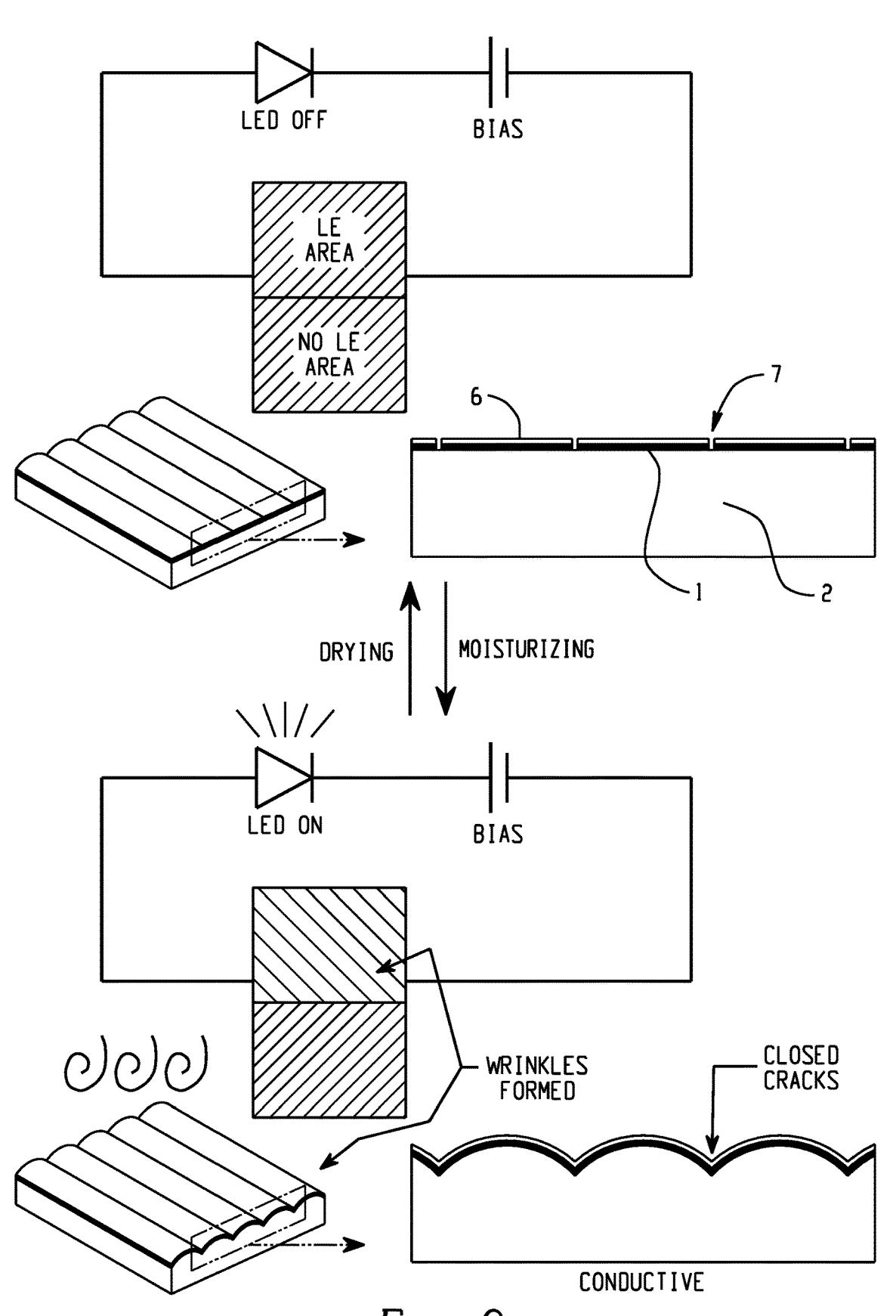
FIG. 6 is an example of a film and method of changing conductivity concomitant with formation of wrinkles upon exposure to moisture and drying.
Figure 7:
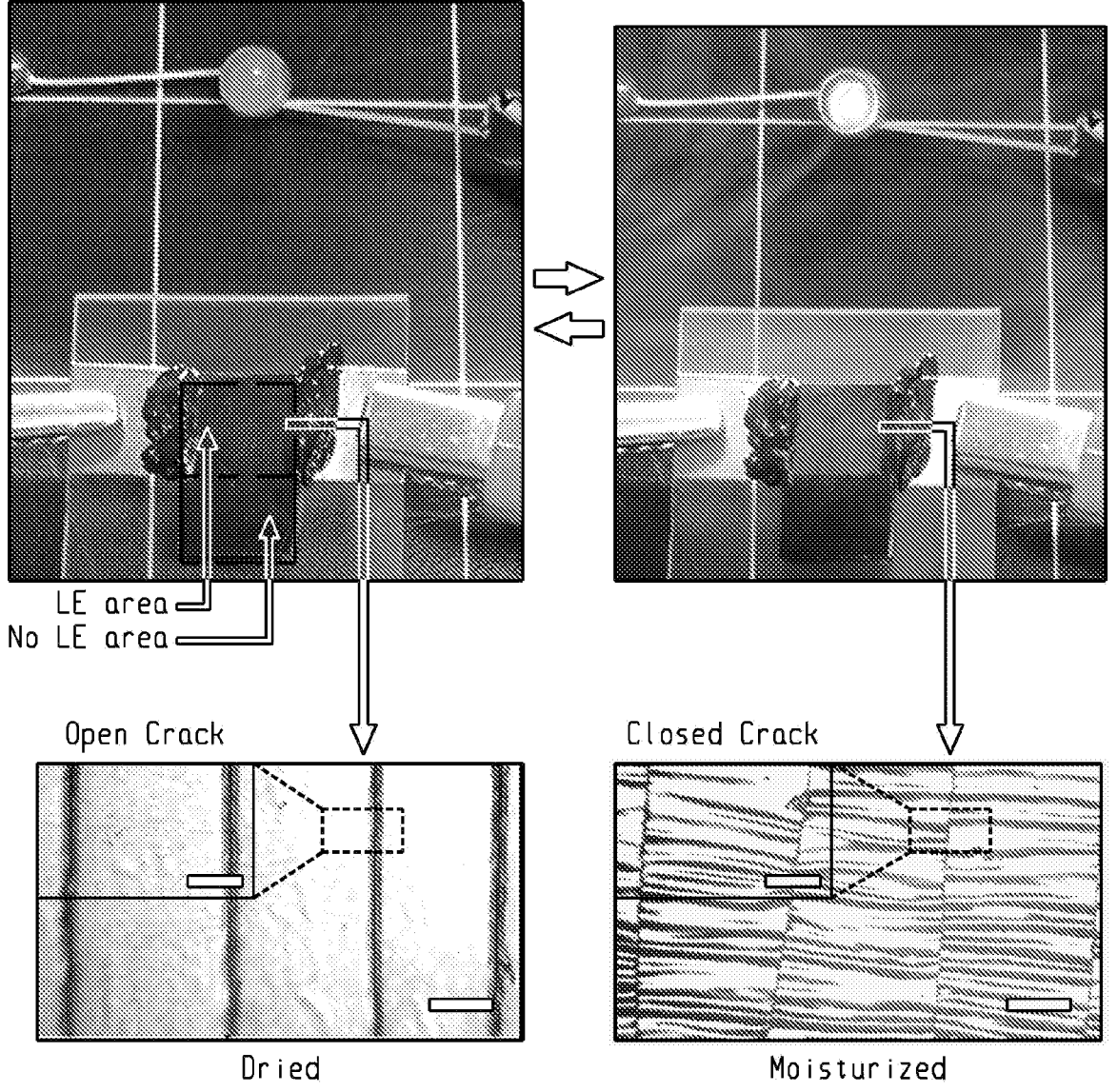
FIG. 7 includes photographs of the film and method of FIG. 6.

A layer of PEDOT:PSS/PVA (PEDOT:PSS obtained from Sigma Aldrich) with a thickness of ca. 235 nm was cast on Sample B surface (mass ratio of PEDOT:PSS to PVA (POVAL™ 28-99)=6:4, and 5.0 mg/mL aqueous solution was used). The resultant sample was cut into a size of 8 mm×16 mm and half of area underwent a laser engraving (LE) power of 1.05 W to generate wrinkles, as shown in FIG. 6. Subsequently, the sample was moisturized and then dried to flatten the LE wrinkles followed by electrically connected to an LED lamp and a power source.

Characterization

The TEM images of the PVA/LP films were captured on a JEOL 2010 FASTEM® transmission electron microscope. The photothermal effect of the samples was tested under the illumination of a 300 W Xenon lamp (Newport Corporation) for specific durations and the corresponding temperatures were recorded by a FLIR E5-XT IR camera. The optical microscopic images were taken by an AmScope ME 520TA microscope under reflective mode. The reflectance spectra were recorded by a Mprobe VIS-NIR thin film measurement system. The UV-Vis transmittance spectra were recorded by a Perkin Elmer ultraviolet/visible/near-infrared Lambda 900 spectrophotometer. The amplitudes of the wrinkles were tested on a ZYGO NewView 5000 non-contact white-light profilometer. Small-angle X-ray scattering (SAXS) analysis was conducted on a Bruker NanoSTAR instrument. The wide-angle XRD patterns were recorded on a Bruker D8 diffractometer. The resistance of the moisture responsive electrical switch was measured by a Keithley 2400 Source Measure Unit. The brightness of the LE area on the moisture responsive electrical switch was captured by a digital camera and analyzed by the Photoshop Express.

Example 1

A first film (Sample A) a PVA/laponite (LP) thin film comprising a low concentration of LP (10 wt. %) and partially hydrolyzed PVA (POVAL™ 8-88) with a low degree of hydrolysis of about 88% and exhibiting low crystallinity and low moisture resistance on a polydimethylsiloxane substrate. The LP nanosheets are randomly distributed in the PVA matrix (see the TEM image in FIG. 2), which can effectively enhance the overall mechanical strength under moisturization (a room temperature mist propelled from a humidifier with a relative humidity (RH) of 100% was used as the moisture source unless otherwise mentioned). A laser power of 1.05 W can generate laser inscribed wrinkles, which can be completely erased by moisturization and re-formed by laser, due to the total release of residual stress in the low degree of hydrolysis PVA by moisturization 11. In contrast, a second film (Sample B) is composed of a higher concentration of LP (40 wt. %) and highly hydrolyzed PVA (POVAL™ 28-99) with a degree of hydrolysis of about 99% exhibiting a high crystallinity and moisture resistance on a polydimethylsiloxane substrate. The high filler concentration allows the LP nanosheets to form a nacre-like nano-architecture as verified by the transmission electron microscopy (TEM) image in FIG. 4. When this film is exposed to a laser power of 1.05 W, the wrinkles can be formed concomitant with maintaining a high level of laponite nanosheet alignment, endowing the film with a high dimensional stability, which can introduce shape recovery effect via effectively restricting the motion of PVA chains. Although moisture can only partially release the stress in the high DH PVA, with residual stress remaining, the wrinkles can still be flattened after the first moisturization and subsequent drying cycle, due to the dominance of dimensional stability induced shape recovery effect over residual stress. Upon further moisturization, wrinkles can be re-generated on the original LE area due to the swelling stress and residual stress and become re-flattened after drying. In contrast, if that same film undergoes a higher laser power of 1.26 W, the wrinkles are still generated. However, the laponite alignment and the corresponding dimensional stability will be undermined, and hence the wrinkles follow a similar moisture resistant response to that of the wrinkles on the pure high degree of hydrolysis PVA, in which the wrinkles cannot be completely erased even under multiple moisturization/drying cycles as verified by the controlled experiment due to the high moisture resistance of this PVA matrix.

Example 2

Versions of Sample A with and without carbon black in the PDMS were illuminated by a Xeon lamp (power=300 W, irradiation distance=10 cm) and the corresponding surface temperatures as a function of illumination time were recorded by a thermal camera. The bilayer containing carbon exhibits a much higher increase in temperature (e.g., 78.6° C. higher after 2 min of illumination) than the counterpart without carbon black. This can be ascribed to the pronounced photothermal effect from the carbon black, which is crucial to establish a suitable laser inscribable power window for wrinkle formation. If no carbon black is incorporated, either no wrinkles were generated at power <2.1 W or the film was burnt at power ≥2.1 W.

Sample A with carbon black in the PDMS showed an aligned wrinkled morphology with optical microscopy after inscribing at a laser power of 1.05 Watts at a rate 1.0 mm$^2$/s. The width of this wrinkled pattern is ca. 100 microns. Decreasing the scanning rate from 1.4 to 1.0 mm$^2$/s can enhance the amplitude of wrinkles from 0.85 to 1.55 microns, due to larger expansion brought by longer laser beam exposure time. No further amplitude increase was observed when the scanning rate was decreased to less than 1.0 mm$^2$/s, ascribed to the surface temperature reaching a maximum value upon sufficiently lengthy laser exposure.

Example 3

Finite element analysis was done simulate wrinkle formation upon prescribing an isotropic thermal expansion strain a in the film of Sample A. When a exceeds a critical value at point A, bifurcation of displacements at the crest and trough of a wave emerges which indicates the wrinkle formation upon the critical thermal strain, as shown for the configurations at points B and C. It can be observed that the simulated wrinkle is well-aligned and perpendicular to the laser scanning direction with a wavelength of ca. 24 microns (μm), which matches well with the corresponding experimental value of ca. 26.2 μm. Such a unique well-aligned wrinkle morphology is attributed to the anisotropic compressive stress inside the film. Both x and y directional stresses, $\sigma_x$ and $\sigma_y$, are negative and ax is significantly greater than $\sigma_y$ for different modulus ratios $E_f/E_s$, where $E_f$ and $E_s$ are elastic moduli of the film and substrate, respectively. This indicates that the PVA/laponite film is in anisotropic compression before wrinkles emerge. Such a stress pattern is due to anisotropic constraints imposed by the surrounding media on the thermal expansion of the film, which is stronger along the scanning direction than in its perpendicular direction. The aligned wrinkled patterns was also observed in a film-substrate strip undergoing uniaxial expansion, where the stress before wrinkles emerging satisfies $\sigma_x > \sigma_y = 0$. The corresponding critical stress and the wavelength can be obtained by $$\sigma_x = \frac{E_f}{4(1 - v_f^2)}\left(3\frac{E_s(1 - v_f^2)}{E_f(1 - v_s^2)}\right)^{2/3}$$

and $$\lambda = 2\pi h_f \left(\frac{1}{4(1 - v_f^2)}\frac{E_f}{E_s}\right)^{1/3}$$

These FEA results for both $\sigma_x$ and $\lambda$ agree with the analytical solutions across a large range of modulus ratios, except for the cases with large modulus ratios where the stress anisotropy is not obvious. If an isotropic compressive stress is present in the film, i.e., $\sigma_x = \sigma_y$, a herringbone wrinkled pattern would emerge as the preferable morphology. In the current system, the x directional stress was significantly larger than that in the y direction, i.e., $\sigma_x > \sigma_y > 0$, due to the stiffer constrain on the material expansion in the scanning direction. Because of this, the film in the x direction will be squeezed more than in the y direction, leading to the preferred configurations with the aligned wrinkles.

Example 4

The laser inscribed wrinkles in Sample A can be instantaneously erased by moisture and re-engraved by laser for many cycles after drying the area, as characterized by the reflectance changes in multiple moisturization-engraving cycles. Although Sample A is opaque due to the existence of carbon black in the PDMS matrix, it can be further modified to possess a decent initial transmittance (62% at 600 nm) in the flat state when much less carbon black is deposited at the interface of the PVA/laponite film and the PDMS substrate (concentration of $CB=0.023$ mg/$cm^2$). This modified Sample A also exhibited a decent photothermal effect as compared to that without carbon black. Thus, the laser inscribed wrinkles (power=1.05 W) can be generated concomitant with a decrease of transmittance to 37% at 600 nm, and it can be rapidly and reversibly erased by moisture within 5 s. Thus, sample A demonstrates a moisture erasable and laser re-writable wrinkles-based patterning surface. Additionally, if a moisturized Sample A was pre-stretched to 30% strain prior to drying, the dried sample could be used to generate aligned laser inscribed wrinkled patterns. Since the PVA/laponite thin film is incompressible, when Sample A is totally released, the PDMS substrate exerts a compressive force to the entire thin film layer. Herein, new aligned wrinkles were generated on the entire thin film surface when released, which concealed the original "UCONN" patterned LE wrinkles in both micro and macro-scale. And these hidden Laser inscribed wrinkles can be revealed again upon re-stretching Sample A to 30% strain. Thus, these wrinkled devices based on Sample A provide intriguing demonstrations for applications in recording or encryption of the moisture/photo/mechanical responsive information.

Example 5

In a Sample B type film, the peeling process created distributed aligned cracks on the brittle film due to the higher concentration (40 wt. %) of laponite (as noted above, no cracks will form on Sample A because its PVA film contains a low laponite concentration (10 wt. %) and thus is sufficiently ductile), which gave rise to a highly anisotropic compressive stress during the photothermal induced expansion process, because the constraints on the expansion were anisotropic in the crack lines. This strong physical confinement effect can lead to vertical alignment of laser inscribed wrinkles (wavelength=35 microns, amplitude=1.55 microns, at laser power=1.05 W) to the cracking direction. To generate laser inscribed wrinkles that are less sensitive to moisture, PVA (POVAL™ 28-99) with a high DH of ca. 99% was chosen for this purpose. PVA (POVAL™ 28-99) exhibits a much higher crystallinity, making it much more resistant to moisture compared to the partially is hydrolyzed PVA (POVAL™ 8-88) used for Sample A. This was confirmed by the control bilayer structure consisting of pure PVA (POVAL™ 28-99) and PDMS/CB, on which the laser inscribed wrinkles could only be partially released by moisture. Meanwhile, the nacre-like laponite alignment in the PVA/LP film is confirmed by the X-ray diffraction (XRD) pattern, which shows an intense basal diffraction peak at 2.9° in the XRD pattern of the PVA/laponite film before laser inscribing. Notably, after a 1.05 W laser power was applied, a slightly more intense peak at the same position is observed, indicating that the LP nanosheet alignment was marginally improved. Herein, the mild photothermal effect under laser power of 1.05 W can induce movement of PVA chains, which is favorable for the alignment of laponite nanosheets, similar to the thermal annealing processing. Therefore, in the PVA/laponite film layer, the well-aligned LP nanosheets play a key role as "hard segments" that improve dimensional stability at molecular-/nano-scale and serve as physical crosslinking points for shape recovery, while the PVA chains act as "soft segments" that are deformable under photothermal effect. As this wrinkled surface was exposed to moisture, only part of the stress created during the laser inscribing process on this area was released, due to the high moisture resistance of PVA, and thus partial residual stress remained. In this moisturization step, although the shape memory effect originating from the dimensional stability induced by the aligned laponite nanosheets tended to re-flatten the surface, it failed to compete with the moisture induced swelling stress and the residual stress, as a result these two variables enabled the presence of wrinkles at a wet state. However, upon being dried, the shape recovery effect overcame the residual stress and effectively restricted the motion of PVA chains, enabling the release of the microscale LE wrinkles into a flattened surface. During re-moisturization, the residual stress combined with the swelling stress again collectively generated wrinkles on the original laser inscribed area. Note that no wrinkles can be formed upon moisturization if the surface did not undergo laser inscribing treatment, because only swelling stress without residual stress from laser inscribing process was not sufficient to generate wrinkles. Therefore, upon re-moisturization, the labyrinth patterned wrinkled surface attributed to the isotropic swelling stress (wavelength=9.5 microns; amplitude=401 nm) was generated on the original laser inscribed area and it was re-flattened after dried. In addition, the open cracks in can close concomitant with the wrinkle formation during the following moisturization cycle due to the swelling effect. This collective actuation of cracks and wrinkles upon moisturization inspire the design of novel moisture responsive electrical switch, in which the open/close of the cracks can function as an electrical switch and the concomitant wrinkle formation/disappearance can be used as optical signals to indicate the working status of the switch. The wrinkles in Sample B maintain excellent reversibility as treated by at lower power over multiple moisturization and drying cycles.

Example 6

With a high laser power=1.26 W used on a Sample B, similar aligned wrinkles (wavelength=47 microns; amplitude=1.5 microns) can also be generated but demonstrate undermined laponite alignment. This is because the PVA chains experience significantly large deformations when they are heated by this high laser inscribing power, and the random chain movement disrupts the laponite nanosheet orientation, undermining the laponite alignment. This effect was further investigated by small angle X-ray scattering (SAXS) which shows the SAXS patterns around the Bragg angle (q~0.21 $Å^{-1}$) under different incident beam angles to the PVA/laponite film. To quantitatively analyze the laponite alignment, the intensity at the Bragg angle as a function of incident beam angle was plotted and fitted, showing the full width at half maximum (FWHM) of the fitting curves of the PVA/LP with LE=1.05 W, without LE, and with LE=1.26 W are 18.7°, 21.2°, and 24.7°, respectively. A higher FWHM indicates a lower degree of overall alignment, which is consistent with the XRD result. In this case, the LP nanosheets are not able to effectively restrict the motion of the PVA chains and thus the shape recovery effect is significantly undermined. Therefore, the wrinkled surface was only partially released as dried from moisturization (wavelength=18 □m, amplitude=536 nm after being moisturized), which exhibited a similar moisture response as the pure PVA. The moisture responsive dynamics of the wrinkles on Sample B under LE=1.05 and 1.26 W demonstrates that the laser inscribing process can not only generate microscale wrinkles, but also tailor the laponite alignment in the film by varying the laser power, and the change of this nanoarchitecture eventually determines the moisture responsiveness of the wrinkles.

Example 7

A moisture responsive anti-counterfeit device based on Sample B was developed. This Sample B was subject to laser inscribing with 1.26 and 1.05 W on different areas of a QR code pattern. Upon being moisturized and dried, the original LE area with 1.05 W beam was re-flattened, while the wrinkled area engraved by 1.26 W beam maintained visible with the word "MOISTURE" exhibited. Thus, to reveal the QR code hidden on the original LE area with 1.05 W beam, moisturization (such as through breathing) is needed to activate the wrinkles, and it re-flattens again once dried.

Example 8

A moisture responsive electrical switch based on Sample B was designed. Sample B was further modified with a thin electrically conductive PEDOT:PSS/PVA layer deposited atop the PVA/laponite film with only half of the sample area treated by a laser power of 1.05 W. The laser inscribing area was moisturized and dried prior to being connected to a LED lamp and a power source. Hence, the laser inscribed area is flattened with open cracks and is in a non-conductive state when dried. Upon moisturization, wrinkles form on the laser inscribed area concomitant with the closing of the cracks due to the swelling stress, which allows this area to exhibit reflectance/brightness changes due to the wrinkle formation and become conductive to turn on the LED lamp as the crack closed. After moisturization, the initial high resistance ($\sim 5.06 \times 10^3$ M$\Omega$) of the LE area dropped drastically to $\sim 595$ k$\Omega$ due to the crack closing, concomitant with the dramatic change in the brightness from $\sim 29\%$ to $\sim 55\%$ due to the wrinkle formation within 5 s, which acts as a diffuse reflector. The device demonstrates an excellent reversibility after many cycles of moisturization and drying. An abrupt change at $\sim 18$ M$\Omega$ was shown on the curves for resistance evolution, attributed to the crack opening at the drying cycle or the crack closing at moisturization cycle, respectively. The resistance drastically decreased from levels of about 5000 M$\Omega$ to levels of about 5-50 M$\Omega$ when the relative humidity increased past to 80%, accompanied with a dramatic increase in brightness from about 25% up to 35-50%.

This disclosure further encompasses the following aspects.

Aspect 1. A method comprising providing a film of a soft polymeric or elastomeric substrate capable of absorbing light and converting it to heat and a second layer directly or indirectly adhered to the substrate, the second layer comprising a hydrophilic polymer, such as polyvinyl alcohol, and nanosheets of a layered inorganic material, preferably the layered inorganic material is laponite, irradiating the film with a source of radiation, such as a laser, to form wrinkles in a region that of the film that was irradiated.

Aspect 2. The method of Aspect 1 further comprising exposing the irradiated film to moisture.

Aspect 3. The method of Aspect 2 wherein the exposure to moisture removes the wrinkles.

Aspect 4. The method of Aspect 2 further comprising drying the film.

Aspect 5. The method of Aspect 4 wherein moisturizing and drying removes the wrinkles further comprising re-exposing the film to radiation to form new wrinkles.

Aspect 6. The method of any of the previous Aspects wherein the amount of the nanosheets of layered inorganic material in the second layer is less than 30% by weight based on total weight of the second layer.

Aspect 7. The method of any of the previous Aspects wherein the irradiating of the film is at a low power level.

Aspect 8. The method of Aspect 1 further comprising exposure to moisture which does not remove the wrinkles, followed by drying to remove the wrinkles.

Aspect 9. The method of Aspect 8 further comprising re-moisturizing the film restores the wrinkles.

Aspect 10. The method of Aspect 9 further comprising, at least once, redrying to remove the wrinkles and optionally remoisturizing a second time to restore the wrinkles.

Aspect 11. The method of any one of Aspects 8-10 wherein the amount of the nanosheets of layered inorganic material in the second layer is at least 30%, preferably at least 35%, by weight based on total weight of the second layer.

Aspect 12. The method of any of Aspects 8-11 wherein the irradiating of the film is at a low power level.

Aspect 13. The method of Aspect 1 wherein after irradiating, the wrinkles are resistant (i.e., remain) upon exposure to moisture and optionally drying.

Aspect 14. The method of Aspect 13 wherein the amount of the nanosheets of layered inorganic material in the second layer is at least 30%, preferably at least 35%, by weight based on total weight of the second layer.

Aspect 15. The method of Aspect 13 or 14 wherein the irradiating is at a high power.

Aspect 16. The method of Aspect 1 wherein the irradiation comprises irradiating a first portion at a low power to form a first region that is characterized in that upon exposure to moisture and drying the wrinkles are removed but upon re-moisturizing the wrinkles are restored and irradiating a second portion at a high power to form a second region of wrinkles that are resistant to moisture and drying.

Aspect 17. The method of Aspect 16 wherein the amount of the nanosheets of layered inorganic material in the second layer is at least 30%, preferably at least 35%, by weight based on total weight of the second layer.

Aspect 18. The method of any one of Aspect 1-7 wherein the second layer is electrically conductive and/or there is an electrically conductive layer on the second layer and wherein upon exposure to moisture the film becomes a conductor.

Aspect 19. The method of claim of any one of Aspect 8-12 wherein the second layer is electrically conductive and/or there is an electrically conductive layer on the second layer and wherein upon exposure to moisture the film and drying the film becomes a conductor and upon re-exposure to moisture it ceases to be a conductor.

Aspect 20. A film comprising an elastomeric or soft polymer substrate that is capable of converting light to heat a second layer comprising a hydrophilic polymer and nanosheets of layered inorganic material dispersed in the hydrophilic polymer.

Aspect 21. The film of Aspect 20 wherein the substrate further comprises photothermally active particles, such as carbon black, metal, etc.

Aspect 22. The film of Aspect 21 wherein the photothermally active particle shave a size of 10-100, preferably 20-60 nm.

Aspect 23. The film of Aspect 21 or 22 wherein the weight ratio of the elastomer or soft polymer to the photothermally active particles is 5:1 to 500:1.

Aspect 24. The film of any one of Aspects 20-23 wherein the substrate comprises polydimethylsiloxane.

Aspect 25. The film of any of Aspects 20-24 wherein the nanosheets of layered inorganic material are laponite.

Aspect 26. The film of any of Aspects 20-25 wherein the amount of layered inorganic material is from 5 to 60, preferably 10 to 50, weight percent of the second layer.

Aspect 27. The film of any of Aspects 20-26 wherein the layered inorganic material has a thickness of less than 2 nm, preferably less than 1.5 nm, more preferably less than 1 nm.

Aspect 28. The film of any of Aspects 20-27 wherein the layered inorganic material nanosheet has a long dimension (e.g., radius or length and width) of 10 to 100, preferably 15-75, more preferably 20-50 nm.

Aspect 29. The film of any of Aspects 20-28 wherein the thickness of the second layer is 10 nm to 5 mm, preferably 100 nm to 600 nm.

Aspect 30. The film on any of Aspects 20-29 wherein the thickness of the substrate is 0.1 mm to 5 mm, preferably 0.5 to 2 mm.

Aspect 31. The film of any of aspects 20-30 wherein the hydrophilic polymer comprises repeat units of $-(CH_2-CHOH)_m-$, and $-(CH_2-CHOCOCH_3)_n-$.

Aspect 32. The film of any of Aspects 20-31 having a degree of hydrolysis of at least 75%, preferably 77 to 90% for rewritable films and preferably at least 95%, more preferably 95-99.99% for single write films.

Aspect 33. The film of any of Aspects 20-32 further comprising a layer of conductive material disposed on the second layer opposite the substrate.

Aspect 34. The film of Aspect 33 wherein there are gaps in the second layer and the layer of conductive material.

Aspect 35. The method of any one of Aspects 1-19 using the film of any one of Aspects 20-34.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g., "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent").

The disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless specified to the contrary herein, all test standards are the most recent standard in effect as of the filing date of this application, or, if priority is claimed, the filing date of the earliest priority application in which the test standard appears.

What is claimed is:

1. A method comprising;

obtaining a film comprising an elastomeric substrate wherein the substrate comprises an elastomeric material and photothermally active particles; and a layer directly or indirectly adhered to the substrate, the layer comprising a hydrophilic polymer and nanosheets of a layered inorganic material wherein a thickness of the layer is 100 to 600 nanometers, irradiating the film with a source of radiation which the photothermally active particles convert to heat to cause thermal expansion to form wrinkles in a region of the film that was irradiated.

2. The method of claim 1 further comprising exposing the irradiated film to moisture.

3. The method of claim 2 further comprising drying the film wherein the wrinkles are removed by the exposure to moisture and/or by the drying and then exposing the film to radiation a second time to form new wrinkles.

4. The method of claim 1 wherein the amount of the nanosheets of layered inorganic material in the layer is less than 30% by weight based on total weight of the layer.

5. The method of claim 2 further comprising drying to remove the wrinkles and optionally re-moisturizing the film restores the wrinkles.

6. The method of claim 1 wherein after irradiating, the wrinkles remain after exposure to moisture and optionally drying.

7. The method of claim 5 wherein the amount of the nanosheets of layered inorganic material in the layer is at least 30%, by weight based on total weight of the layer.

8. The method of claim 1, wherein the layer is electrically conductive and/or there is an electrically conductive layer on the layer opposite the substrate and wherein upon exposure to moisture after irradiation the film becomes a conductor.

9. The method of claim 1 wherein the layered inorganic material is laponite.

10. The method of claim 6 wherein the amount of the nanosheets of layered inorganic material in the layer is at least 30% by weight based on total weight of the layer.

11. The method of claim 8 wherein upon subsequent drying the film ceases to be a conductor.

12. The method of claim 1 wherein the photothermally active particles comprise carbon black.

13. The method of claim 1 wherein the hydrophilic polymer is a polyvinyl alcohol and the source of the radiation is a laser.

14. The method of claim 1 wherein a weight ratio of the elastomeric material to the photothermally active particles is 5:1 to 500:1.

15. The method of claim 1 wherein the elastomeric material comprises polydimethylsiloxane.

16. The method of claim 1 wherein the hydrophilic polymer comprises repeat units of $-(CH_2-CHOH)_m-$, and $-(CH_2-CHOCOCH_3)_n-$.

* * * * *